Oct. 30, 1923. 1,472,709
M. WIESENFELD
ARTIFICIAL TREE
Filed March 16, 1923
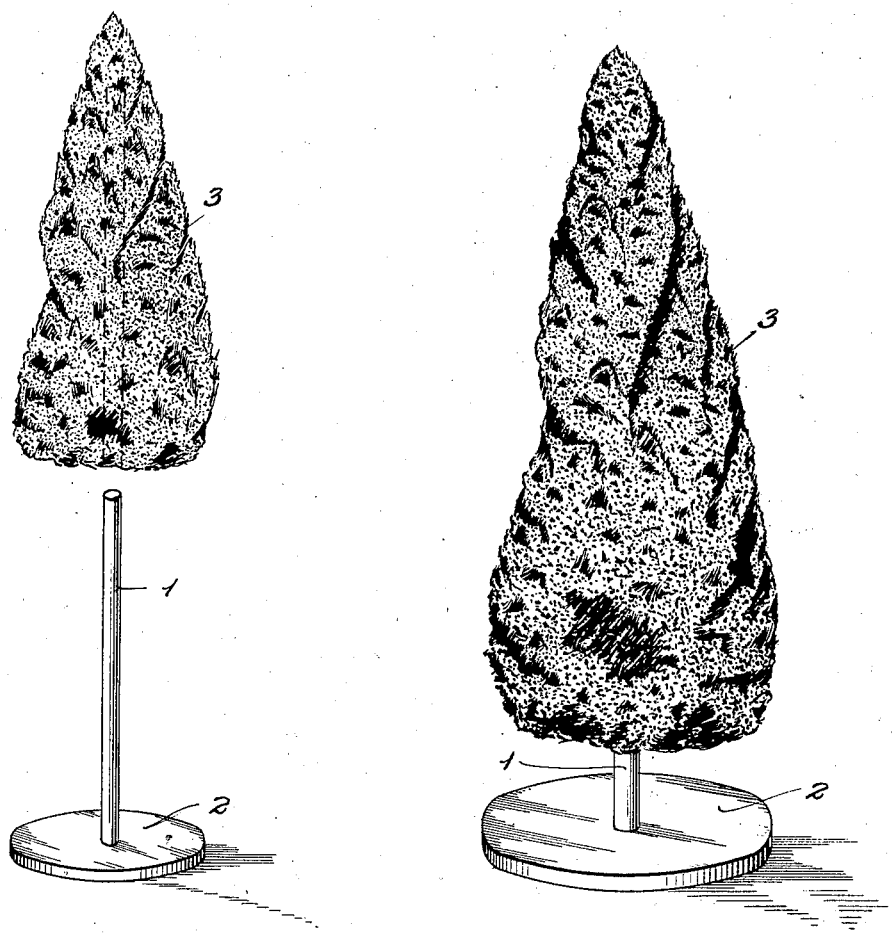
Fig. II  Fig. I
Inventor
Moses Wiesenfeld
By Knight
Attorneys Patented Oct. 30, 1923.

1,472,709

UNITED STATES PATENT OFFICE.

MOSES WIESENFELD, OF BALTIMORE, MARYLAND.

ARTIFICIAL TREE.

Application filed March 16, 1923. Serial No. 625,635.

*To all whom it may concern:*

Be it known that I, MOSES WIESENFELD, a citizen of the United States, residing at Baltimore, in the State of Maryland, have invented certain new and useful Improvements in Artificial Trees, of which the following is a specification.

My invention relates to artificial trees, simulating in miniature natural trees, bushes or the like for use as toys or novelty ornaments.

The object of the invention is to produce such articles cheaply and in closer imitation of the natural originals than has heretofore been realized.

Artificial miniature trees or the like, according to my invention, comprise a stem of wood or other suitable material, proportioned and colored to simulate the trunk or stem of such natural objects; a suitable base, as, for example, a disc of wood, to which the lower end of the stem is secured to support the stem in upright position; and a mass of imitation foliage affixed to the stem an appropriate distance above the base. My invention resides mainly in this mass of imitation foliage, which will now be described.

I have discovered that ordinary sponge is peculiarly well adapted to the purpose of simulating a mass of foliage and my invention consists in employing this material for that purpose. A single piece of sponge, cut in a shape which simulates the external contour of a tree or the like of any variety, and suitably tinted, will closely imitate the natural object without further treatment. This is due to the fibrous and porous nature of sponge, which gives softness of outline and texture combined with a lack of uniformity and symmetry which will be found in the objects imitated. At the same time, sponge combines a requisite degree of rigidity with the lightness which is desirable in articles of this kind.

In the drawings:

Fig. 1 is a perspective view of the article and,

Fig. 2 is a separated view of the parts in elevation.

In the accompanying drawing I have shown, by way of illustration, an artificial miniature cedar tree, comprising a stem or trunk 1, a base 2 having a central perforation into which the stem 1 is inserted, and a piece of sponge 3, cut in simulation of the foliage of a cedar tree. The sponge is preferably tinted or dyed a natural shade of green, and the stem may be given a darker shade of brownish green, while the base may be colored brown or light green in imitation of soil or grass. In assembling the article the stem is forced into the sponge far enough to stiffen the former and adhesive is preferably applied to the stem.

It will be understood that the sponge may be made to assume shapes as various as can be found in nature or conceived by the imagination, and that my invention is not to be regarded as limited by the foregoing description within the scope of the following claims.

I claim:

1. An artificial tree or the like in which the foliage is composed of sponge.

2. An artificial tree or the like comprising a stem, a piece of sponge cut in a shape which resembles the foliage of a tree or the like and mounted on said stem, and means for supporting said stem and sponge in upright position.

The foregoing specification signed at Baltimore, Md., this 15th day of February, 1923.

MOSES WIESENFELD.